United States Patent Office 3,061,552
Patented Oct. 30, 1962

3,061,552
NON-DISCOLORING NONIONIC SURFACE
ACTIVE COMPOSITIONS
Leslie M. Schenck, Mountainside, and Leslie G. Nunn,
Jr., Metuchen, N.J., assignors to General Aniline &
Film Corporation, New York, N.Y., a corporation of
Delaware
No Drawing. Filed Mar. 31, 1960, Ser. No. 18,860
7 Claims. (Cl. 252—135)

This invention relates to a new nonionic surfactant composition of matter and particularly to new non-discoloring chlorine containing nonionic surface active compositions.

It is known that polyethoxylated phenols and polyethoxylated aliphatic alcohols are useful nonionic surfactants being especially adaptable as wetting agents, emulsifiers, and the like. They are not, however, suitable for formulations requiring the presence of large amounts of alkaline media. Ordinarily, surfactants of the type of polyethoxylated phenols and polyethoxylated aliphatic alcohols are notoriously subject to degradation and discoloration in the presence of an alkaline medium such as caustic soda, or caustic potash alone or in combination with an alkali metal silicate. The purpose of adding such alkaline medium to the surfactant is to decrease surface tension, increase the emulsification ability and also the rate of penetration such as in the wetting of an impervious membrane i.e., a paint film, grease film, oil film, and the like. In view of this discoloration and degradation, the polyethoxylated phenols and polyethoxylated aliphatic alcohols have not been employed in the formulation of alkaline surfactant compositions.

It is also known that the chlorides of polyethoxylated phenols and polyethoxylated aliphatic alcohols are useful as intermediates in the syntheses of sulfonates and amines to yield surfactant compositions. In these syntheses, the chlorine group in the polyethoxylated phenol or polyethoxylated aliphatic alcohol is sufficiently reactive to form the various intermediates. For example, the chlorine derivative may be reacted with amines to yield quaternaries or with sodium sulfite to yield sulfonates. In view of this reactivity, it has been concluded by the surfactant art that such chlorides could not be mixed with caustic soda and other strong alkalies because of the replacement of the chlorine atom by a hydroxyl group yielding the corresponding polyglycol monoether and sodium chloride.

It is an object of the present invention to provide a non-discoloring alkaline surfactant composition containing a chloride of either a polyethoxylated phenol or a polyethoxylated aliphatic alcohol.

Other objects and advantages will become more clearly manifest from the following description:

We have discovered that the chlorides of polyethoxylated phenols and polyethoxylated aliphatic alcohols are readily mixed with alkali metal hydroxide and certain alkali metal silicates, including common fillers or soap builders, to yield non-discoloring, nonionic surface active composition having manifold cleaning applications such as in the cleaning of metals of all types prior to plating, fabricating and processing, glass, dishes, bottle washing, and the like.

In preparing the new compositions in accordance with our invention, we can take any polyethoxylated phenol or polyethoxylated aliphatic alcohol and convert it to the corresponding chloride by conventional means or in lieu thereof employ directly the chlorides of any polyethoxylated phenol or polyethoxylated aliphatic alcohol in specified proportions for admixture with an alkali metal hydroxide and certain alkali metal silicates. The preparation of the polyethoxylated phenols and polyethoxylated aliphatic alcohols is described in great detail in United States Patents 1,970,578; 2,213,477; 2,575,832; 2,593,112 and 2,676,975, the disclosures of which are incorporated herein as illustrative of such polyglycol monoethers. The corresponding chlorides are disclosed in United States Patents 2,249,111; 2,098,203; 2,097,441; 2,097,411 and 2,209,911, the disclosures of which are likewise incorporated by reference thereto for specific illustrations of the type of chloride derivatives. In this connection, it is to be noted that any type of polyglycol monoether or the corresponding chloride thereof disclosed and illustrated in said patents are capable of admixture with alkali metal hydroxides, alkali metal silicates, and if desired, with certain soap builders or fillers as will be shown hereinafter.

The chlorides of the polyethoxylated phenols and polyethoxylated aliphatic alcohols utilized in the preparation of the non-discoloring nonionic surface active compositions of the present invention are characterized by the following general formula:

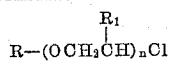

$$R-(OCH_2\overset{R_1}{\underset{|}{C}H})_nCl$$

wherein R represents either an alkyl group of 8 to 18 carbon atoms or a phenyl or naphthyl group substituted by 1 or 2 alkyl groups of 8 to 18 carbon atoms, $R_1$ represents either hydrogen or a methyl group, and $n$ represents a positive integer of from 2 to 100.

The non-discoloring chlorine containing nonionic surface active compositions prepared in accordance with the present invention, while utilizing the foregoing chlorides, are characterized by the following recipe:

| Component— | Percent by weight |
|---|---|
| (1) Chloride derivative | 2.0–20 |
| (2) At least one alkaline material selected from the class consisting of alkali metal hydroxides and alkali metal silicates | 98–80 |

From the foregoing recipe it is clearly evident that from 80 to 98% by weight of any one of the alkali metal hydroxides such as sodium or potassium hydroxide may be blended with 2.0 to 20% by weight of the chloride derivative. In lieu of the alkali metal hydroxides alone or mixtures thereof, the proportions of which in the mixture are not critical, alkali metal silicates such as sodium or potassium meta-, ortho-, or sesqui-silicates may be used in the same amounts, i.e. from 80 to 98%. Here as in the case of the alkali metal hydroxides, the alkali metal silicates may be used as such or mixtures thereof, the proportions of which are likewise not critical. It is also clear that a mixture consisting of an alkali metal hydroxide and an alkali metal silicate may be used. The proportions constituting the mixture are not at all critical so long as the surfactant composition contains from 2.0–20% by weight of the chloride derivative and from 80–98% by weight of any one of the foregoing alkaline materials or mixtures thereof.

There may be added to the foregoing recipe, if desired, from 10 to 30% by weight per 100 parts by weight thereof of the common builders such as the alkali metal phosphates, carbonates, sulfates and borates including sodium or potassium di-silicates and common water glass.

In the actual preparation of the non-discoloring chlorine containing nonionic surfactant compositions in accordance with the foregoing recipe, the chloride derivative in an amount ranging from 2 to 20% by weight is added to a mixing drum into which has been placed from 80 to 90% by weight of anyone of the foregoing alkaline materials or mixtures thereof and the entire mixture blended for a period of time ranging from 1 to 1½ hours. For this purpose any of the conventional mixers may be employed. The alkali metal hydroxides that are normally commercially available are in flake or powdered form. The alkali metal silicates, with the exception of water glass, are also in flake or in powdered form and no difficulty will be encountered in the blending of a uniform mixture.

The following examples are illustrative of the actual preparation of the chloride derivatives of various polyethoxylated phenols and polyethoxylated aliphatic alcohols which are blended with the alkaline material as above described. All parts given are by weight.

*Example I*

A total of 71.5 parts of thionyl chloride were added slowly over a 35 minute period to 330 parts of a polyglycol monoether obtained by conventional condensation of 1 mole of nonyl phenol with 10 moles of ethylene oxide at 25–45° C. Following the addition, the charge was heated to 100° C. over a 2-hour period and held at this temperature for 4 hours. Excess thionyl chloride and hydrogen chloride were removed by vacuum stripping the reaction mixture at 100° C. for 2 hours. A yield of 322 grams of a product having the following formula was obtained:

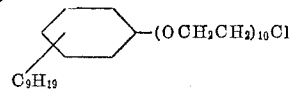

The chloride content was 5.6% compared to a theoretical chloride of 5.7%.

*Example II*

To 440 parts of a polyglycol monoether obtained by the condensation of 1 mole of nonyl phenol with 15 moles of ethylene oxide, 71.5 parts of thionyl chloride were added at 20–30° C. over 1 hour. The charge was then heated to 100° C. over a 2 hour period and held at this temperature for 4 more hours. It was then cooled to 50° C. and vacuum stripped to remove thionyl chloride and unwanted chlorides. The temperature was gradually raised to 100° C. over a 2 hour period and vacuum stripped to remove the last traces of the unwanted chloride. A total of 422 grams of product having a chloride content of 3.9% (theory 4%) was obtained.

*Example III*

510 parts of the condensation product of 1 mole of nonyl phenol with 30 moles of ethylene oxide was chlorinated by the addition of 48 parts of thionyl chloride at 35–40° C. The reaction mixture was heated to 100° C. over 2 hours and held at this temperature for 4 additional hours. It was then cooled to 50° C. and stripped under vacuum to remove hydrogen chloride and unreacted chlorides. Last traces of unwanted chlorides were removed by raising the temperature to 100° C. toward the end of the vacuum stripping operation. The final product consisted of 490 parts having a chloride content of 2.1% as compared to a theoretical value of 2.3%.

*Example IV*

There were added 15 parts of thionyl chloride to 242 parts of the condensation product of 1 mole of nonyl phenol with 50 moles of ethylene oxide at 55–60° C. The reactants were heated to 100° C. over a 2 hour interval and allowed to react at this temperature for 4 hours. Unreacted acid by-product chlorides were removed under reduced pressure at 50–100° C. The product had a cloud point (1% solution in distilled water) of 91° C.

*Example V*

A charge of 462 parts of a condensation product of 1 mole of nonyl phenol with 100 moles of ethylene oxide was chlorinated by addition of 15 parts of thionyl chloride at 55–60° C. It was then heated to 100° C. over a 2 hour period and held at this temperature for 4 hours to complete reaction. The reaction mixture was heated under vacuum to remove excess and by-product halides. Desired product had a cloud point (1% solution in distilled water) of over 100° C.

*Example VI*

332 parts of the condensation product of 1 mole of tridecyl alcohol with 3 moles of ethylene oxide was chlorinated with 183 parts of thionyl chloride at a temperature of 20–30° C. over a period of 1 hour, followed by heating the mixture to 100° C. over 2 hours and holding it at 100° C. for 4 hours longer. The reaction mixture was then heated under vacuum for 2 hours at 50–100° C. to remove unwanted halides. Cloud point (1% solution in distilled water) of the desired product was below 1° C.

*Example VII*

A total of 362 parts of the condensation product of 1 mole of lauryl alcohol with 4 moles of ethylene oxide were reacted with 183 parts of thionyl chloride at 20–30° C. for 1 hour. The reaction mixture was heated to 100° C. over 2 hours and held for 4 hours at this temperature. It was then stripped under vacuum for 2 hours at 50–100° C. to remove volatiles. The cloud point (1% solution in distilled water) of the product was below 1° C.

*Example VIII*

To 430 parts of the condensation product of 1 mole of nonyl phenol with 15 moles of ethylene oxide, 91.5 parts of thionyl chloride were added at 20–30° C. over an hour. The reactants were then heated to 100° C. over 2 hours and held at 100° C. for 4 hours. Excess and other unwanted chlorides were removed from the reaction mixture by heating at 50–100° C. for 2 hours under vacuum. The desired product had a cloud point (1% solution in distilled water) of 46° C.

*Example IX*

288 parts of the condensation product of 1 mole of olcyl alcohol with 7 moles of ethylene oxide were chlorinated by 91.5 parts of thionyl chloride at 20–30° C., heating the mixture to 100° C. over 2 hours, and holding it at this temperature for 4 hours. Excess and unwanted chlorides were distilled off under reduced pressure at 50 to 100° C. The product had a cloud point (1% solution in distilled water) below 1° C.

*Example X*

A total of 91.5 parts of thionyl chloride were added to 320 parts of the condensation product of 1 mole of tridecyl alcohol with 10 moles of ethylene oxide at 20–30° C. over 1 hour. This mixture was heated to 100° C. over a 2 hour period and kept at this temperature 4 hours longer. It was then vacuum stripped at 50 to 100° C. to remove undesirable volatiles to obtain 310 parts of the chlorinated product.

*Example XI*

To 264 parts of the condensation product of 1 mole of nonyl phenol with 2 moles of ethylene oxide, a total of 183 parts of thionyl chloride were added at 20 to 30° C. over 1 hour. This mixture was heated 100° C. over 2 hours and reacted at this temperature for 4 hours. Unreacted and unwanted chlorides were removed by evacuating the mixture at 50 to 100° C. This reaction yielded 251 parts of chlorinated product.

*Example XII*

A total of 396 parts of the condensation product of 1 mole of nonyl phenol with 4 moles of ethylene oxide were reacted with 183 parts of thionyl chloride at 20–30° C. over 1 hour, heated to 100° C. over 2 hours and held for 4 hours at this temperature. The mixture was evacuated at 50° to 100° C. to remove undesirable volatiles. A total of 379 parts of product was obtained.

*Example XIII*

A charge of 600 parts of the condensation product of dinonyl phenol with 6 moles of ethylene oxide was chlorinated by the reaction of 183 parts of thionyl chloride at 20 to 30° C. over 1 hour, heating the mixture to 100° C. over 2 hours and maintaining it at this temperature for 4 hours. Excess and by-product chlorides were removed by heating under vacuum at 50 to 100° C. This reaction gave 468 parts of chlorinated product.

*Example XIV*

430 parts of the condensate of 1 mole of oleic acid with 5 moles of ethylene oxide was chlorinated by the addition of 91.5 parts of thionyl chloride at 20–30° C. over an hour. The mixture was heated to 100° C. over 2 hours and held at 100° C. for 4 hours longer. It was then heated at 50–100° C. under vacuum to strip out unreacted and by-product chlorides. A total of 415 parts of product were obtained from the reaction.

*Example XV*

To 250 parts of a surfactant prepared by reacting 36 moles of ethylene oxide with 1 mole of castor oil, 18.3 parts of thionyl chloride is added over 1 hour at 20–30° C. This mixture is heated to 100° C. over 2 hours and maintained at this temperature for 4 more hours. It is then evacuated at 50 to 100° C. until all undesirable chlorides are removed. A total of 231 parts is obtained.

*Example XVI*

A total of 91.5 parts of thionyl chloride were added to 417 parts of the condensation product of 1 mole of nonyl phenol with a mixture of 6 moles of ethylene oxide and 6 moles of propylene oxide at 20–30° C. for a period of 1 hour. The charge was heated to 100° C. over 2 hours and reacted at this temperature for 4 hours. It was then distilled under vacuum at 50–100° C. to remove volatiles. A total of 398 parts of chlorinated material was obtained.

*Example XVII*

The chlorination of 322 parts of the condensation product of octyl phenol and 2 moles of propylene oxide was effected by the gradual addition of 183 parts of thionyl chloride at 20–30° C., raising the reaction temperature to 100° C. over a 2 hour period and holding it at this temperature for 4 hours. The mixture is vacuum stripped at 50–100° C. to remove unwanted volatiles. A total of 290 parts of product was obtained.

*Example XVIII*

A mixture of 194 parts of tetraethylene glycol and 366 parts of thionyl chloride were reacted at 20–30° C. over an hour, heated to 100° C. over 2 hours and held at 100° C. for 4 additional hours. Excess thionyl chloride and undesirable by-products were removed under vacuum to obtain 170 parts of product.

*Example XIX*

806 parts of the condensation product of octadecyl phenol with 10 moles of ethylene oxide were chlorinated with 183 parts of thionyl chloride at 20–30° C. over 1 hour, followed by heating to 100° C. for an additional 2 hours and then held at the same temperature for an additional period of 3 hours. The excess thionyl chloride and undesirable by-products were removed under vacuum to obtain 709 parts of product.

*Example XX*

916 parts of the condensate of 1 mole of isooctyl β-naphthol with 15 moles of ethylene oxide were chlorinated with 183 parts of thionyl chloride at 20–30° C. over 1 hour, followed by heating to 100° C. for an additional 2 hours and then held at the same temperature for an additional period of 3 hours. The excess thionyl chloride and undesirable by-products were removed under vacuum to obtain 783 parts of product.

In order to determine the color stability in the presence of alkaline media all of the chloro derivatives as prepared in accordance with Examples I to XX inclusive and corresponding terminal hydroxyl nonionic surfactants (polyethoxylated phenols and polyethoxylated aliphatic alcohols) were subjected to the following test procedure:

1 part by weight of each of the products of Examples I to XX, including 1 part by weight of the initial starting material i.e., the corresponding terminal hydroxyl nonionic surfactant, were individually mixed with 19 parts of caustic soda flakes. After thoroughly mixing the 40 individual samples, they were heated at 100° C. for 3 months to simulate storage for long periods of time at normal conditions, i.e., room temperature. After the 3 month period, the samples were examined and found that the individual mixtures containing the chlorinated compound remained colorless while the mixtures containing the terminal hydroxyl surfactant were discolored. In connection with the latter, it was noted that at the initial time of mixing the mixture began to discolor. But after the three months high temperature tests all samples were dark. This test procedure clearly demonstrated the reason why present nonionic surfactants are not utilized in the preparation of alkaline formulations. The following examples illustrate the utilization of the chlorinated compounds with an alkali metal hydroxide and alkali metal silicate with or without filler to yield non-discoloring surface active agents which are especially adaptable for various cleaning operations of dishes, glass bottles, metals and the like.

*Example XXI*

| | Percent by weight |
|---|---|
| Chlorinated compound of Example I | 5 |
| Caustic soda flakes | 25 |
| Sodium meta-silicate | 70 |

After compounding as previously described, the mixture is colorless and remains colorless for an indefinite period of time.

*Example XXII*

| | Percent by weight |
|---|---|
| Chlorinated compound of Example IV | 5 |
| Caustic soda flakes | 95 |

After compounding as previously described, the mixture is colorless and remains colorless for an indefinite period of time.

*Example XXIII*

| | Percent by weight |
|---|---|
| Chlorinated compound of Example V | 4 |
| Caustic soda flakes | 48 |
| Sodium meta-silicate | 48 |

After compounding as previously described, the mixture is colorless and remains colorless for an indefinite period of time.

*Example XXIV*

| | Percent by weight |
|---|---|
| Chlorinated compound of Example VI | 3 |
| Sodium meta-silicate | 97 |

After compounding as previously described, the mixture is colorless and remains colorless for an indefinite perod of time.

*Example XXV*

| | Percent by weight |
|---|---|
| Chlorinated compound of Example VII | 2 |
| Sodium ortho-silicate | 98 |

After compounding as previously described, the mixture is colorless and remains colorless for an indefinite period of time.

*Example XXVI*

| | Percent by weight |
|---|---|
| Chlorinated compound of Example XIII | 4 |
| Caustic potash flakes | 86 |
| Sodium sesqui-silicates | 10 |

After compounding as previously described, the mixture is colorless and remains colorless for an indefinite period of time.

*Example XXVII*

|  | Percent by weight |
|---|---|
| Chlorinated compound of Example XIV | 3 |
| Caustic soda flakes | 2 |
| Sodium sesqui-silicates | 95 |

After compounding as previously described, the mixture is colorless and remains colorless for in indefinite period of time.

*Example XXVIII*

|  | Percent by weight |
|---|---|
| Chlorinated compound of Example XVI | 3 |
| Caustic soda flakes | 2 |
| Sodium ortho-silicate | 95 |

To 100 parts by weight of the above mixture, 15% by weight of trisodium phosphate were added and blended to a uniform mixture. The blended mixture remained colorless for an indefinite period of time.

*Example XXIX*

|  | Percent by weight |
|---|---|
| Chlorinated compound of Example XVII | 20 |
| Caustic potash flakes | 35 |
| Sodium meta-silicate | 45 |

To 100 parts by weight of the above mixture, 30% by weight of common water glass were added and blended until a uniform mixture was obtained. The mixture remained colorless for an indefinite period of time.

Each of the foregoing compounded compositions were exceptionally useful in many cleaning operations such as in the washing of soda pop and milk bottles, in the cleaning of lubricated metal parts and the like.

When the chlorinated derivatives utilized in accordance with the present invention are added in an amount ranging from ½ to 1½% by weight to any powdered alkali metal hydroxide or alkali metal silicate they have the unusual tendency to dedust the said alkaline materials. In other words, such mixture had a lesser propensity of dusting in the atmosphere, and as a consequence is less irritating to the human mucosa when the alkali metal hydroxide or alkali metal silicate is weighed out in chemical operations.

We claim:

1. A non-discoloring nonionic surface active composition comprising from 2 to 20% by weight of the chloride derivative of a nonionic surface active agent selected from the class consisting of polyethoxylated phenols and polyethoxylated aliphatic alcohols, and from 80 to 98% by weight of at least one alkaline material selected from the class consisting of alkali metal hydroxides and sodium and potassium silicates.

2. A non-discoloring nonionic surface active composition according to claim 1 wherein the chloride derivative is that obtained from the condensation of 1 mole of nonyl phenol with 10 moles of ethylene oxide followed by monochlorination.

3. A non-discoloring nonionic surface active composition according to claim 1 wherein the chloride derivative is that obtained from the condensation of 1 mole of lauryl alcohol with 4 moles of ethylene oxide followed by monochlorination.

4. A non-discoloring nonionic surface active composition according to claim 1 wherein the chloride derivative is that obtained from the condensation of 1 mole of oleyl alcohol with 7 moles of ethylene oxide followed by monochlorination.

5. A non-discoloring nonionic surface active composition according to claim 1 wherein the chloride derivative is that obtained from the condensation of 1 mole of tridecyl alcohol with 10 moles of ethylene oxide followed by monochlorination.

6. A non-discoloring nonionic surface active composition according to claim 1 wherein the chloride derivative is that obtained from the condensation of 1 mole of dinonyl phenol with 6 moles of ethylene oxide followed by monochlorination.

7. A non-discoloring non-ionic surface active comprising from ½% to 20% by weight of the chloride derivative of a nonionic surface active agent selected from the class consisting of polyethoxylated phenols and polyethoxylated aliphatic alcohols, and from 80 to 99.5% by weight of at least one alkaline material selected from the class consisting of alkali metal hydroxides and sodium and potassium silicates.

References Cited in the file of this patent

UNITED STATES PATENTS

| 2,209,911 | Bruson et al. | July 30, 1940 |
| 2,212,536 | Britton et al. | Aug. 27, 1940 |
| 2,213,477 | Steindorff et al. | Sept. 3, 1940 |
| 2,249,111 | Bruson | July 15, 1941 |
| 2,596,092 | De Benneville | May 13, 1952 |
| 2,934,568 | Barker | Apr. 26, 1960 |